Nov. 27, 1945.  A. J. LIPPOLD  2,389,672
CONDENSATE DEFLECTOR FOR BOTTLE FILLERS
Filed March 25, 1940  2 Sheets-Sheet 1
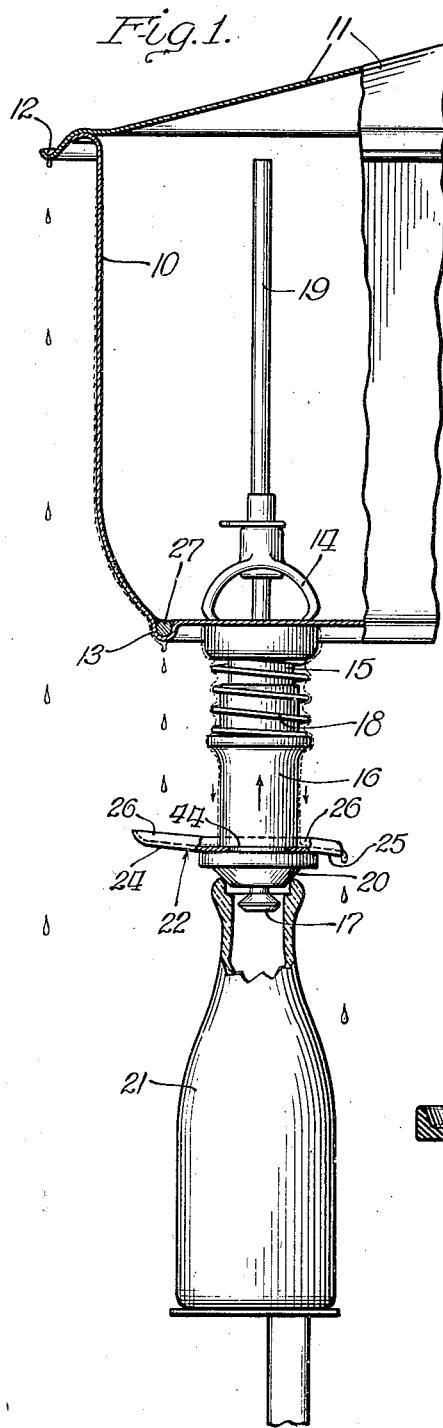
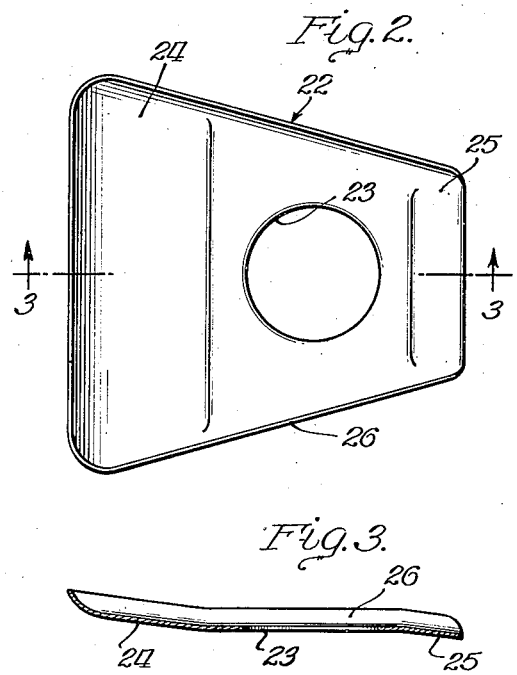
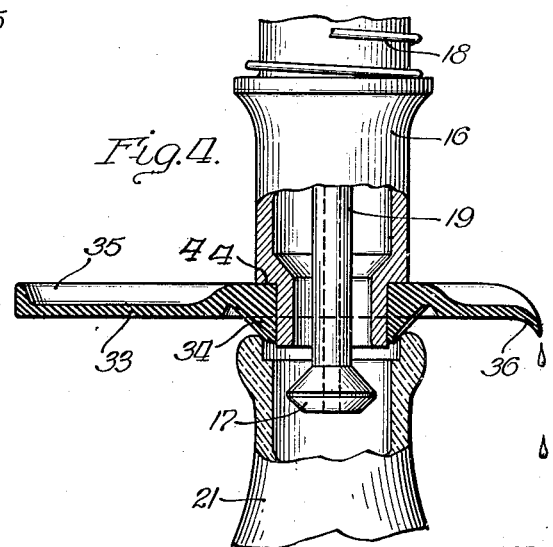
INVENTOR.
Adolph J. Lippold
BY Norman E. H. Heletzky
ATTORNEY.

Nov. 27, 1945. A. J. LIPPOLD 2,389,672
CONDENSATE DEFLECTOR FOR BOTTLE FILLERS
Filed March 25, 1940 2 Sheets-Sheet 2
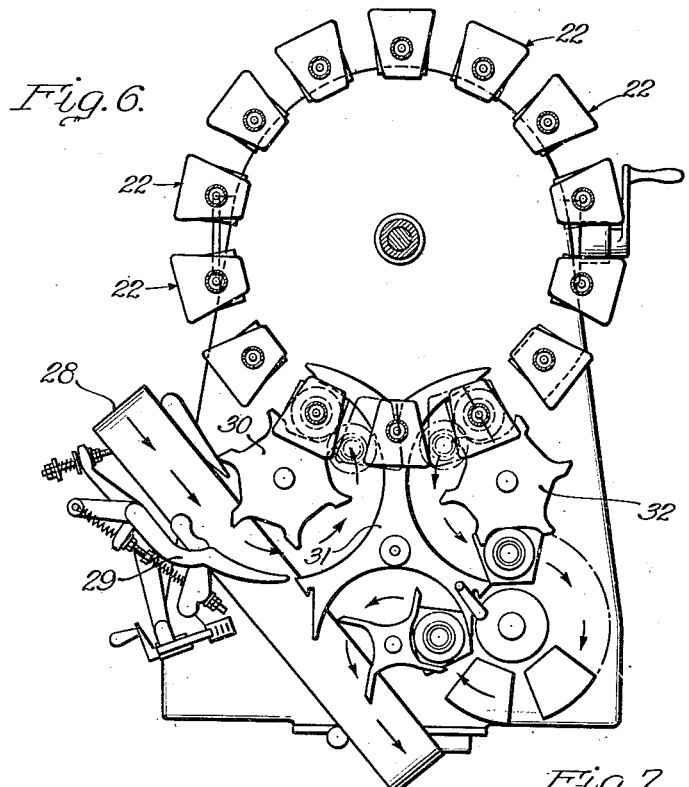
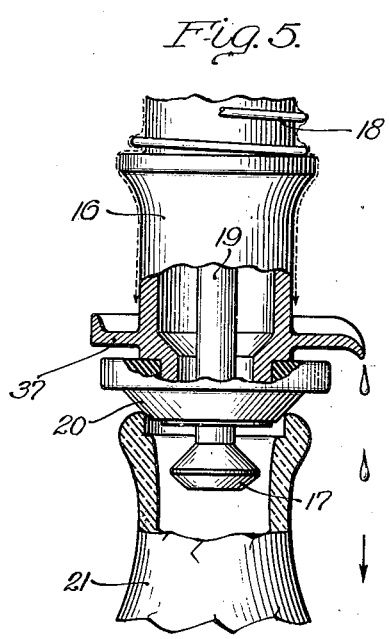
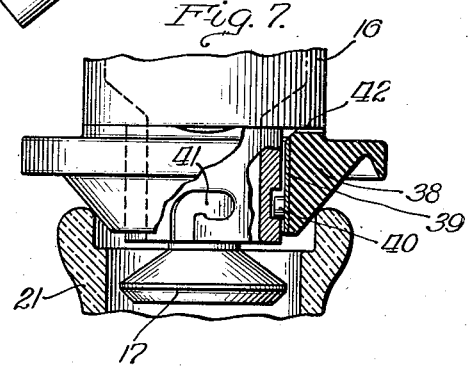
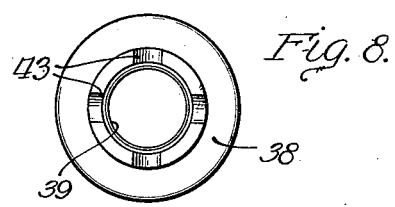
INVENTOR.
Adolph J. Lippold
BY
ATTORNEY.

Patented Nov. 27, 1945

2,389,672

UNITED STATES PATENT OFFICE 2,389,672

CONDENSATE DEFLECTOR FOR BOTTLE FILLERS

Adolph J. Lippold, Milwaukee, Wis., assignor to Cherry-Burrell Corporation, Wilmington, Del., a corporation Application March 25, 1940, Serial No. 325,681

1 Claim. (Cl. 226—129)

This invention relates to condensate deflectors. More particularly the invention relates to condensate deflector mechanisms and constructions thereof for use on a bottle filler to protect the product being filled into bottles from being contaminated by condensate which collects on and drains from the filling apparatus while the bottle is being moved into and away from filling operation.

This invention is particularly adaptable in the bottling of perishable foodstuffs, such as milk. The conventional milk bottle fillers, especially those of large capacity, are usually automatic bottle fillers of the rotary type. In the filling of bottles by an automatic rotary filler, bottles are continuously supplied to the filler by a conveying mechanism from which the bottles are received by a positioning mechanism and positioned below the filling valves of the rotary supply tank of the filling apparatus.

The bottle rotate with the rotary supply tank while being filled and are then removed from below the filling valves by automatic discharge apparatus which then places the bottles back onto a conveyor to be carried to other points in the processing plant. Normally such processing plants are very humid and the milk being filled into bottles is normally very cold. As a direct result of such conditions of humidity and coldness, contaminated condensate normally collects on the outer surface of the milk supply tank and bottle filling valve bodies, both of which are chilled by the cold milk being supplied into the tank from which it passes through the valves into the bottles. Such condensate normally drains from the surface of the supply tank and filling valves and, in so draining, may drop into the empty or filled bottles as they are being moved into or away from position below the filling valves.

The chief objects of this invention are to provide an improved liquid supply tank for a bottle filler and condensate deflector elements to be carried by the bottle filling valves associated with the supply tank to prevent the draining of condensate from the outer surface of the supply tank and filling valves into the empty or filled bottles as they pass to or from filling position and to deflect any condensate which may drain over the filling valves or drain into the path of the bottles being moved toward or away from the filling valves to a position in which the condensate cannot enter the bottles and to provide shielding means to shield the air release mechanism associated with the temporary bottle closures of the filling valve mechanism.

A further object is to provide deflector elements to be carried by the filling valves on the supply tank which may be quickly and easily attached to the standard type of filling valves of the conventional milk bottle filling apparatus; which are sanitary in design; which may easily and quickly be attached to and removed from the filling valves; and which are inexpensive to produce.

The foregoing and other objectives and important features of this invention will become more apparent as the nature of the invention is better understood. The preferred embodiments of the invention are hereinafter more fully described and may be best understood from the following description of the specific embodiments when read in connection with the accompanying drawings in which:

Figure 1 is a fragmentary view in transverse section through an improved filling apparatus supply tank provided with a filling valve and condensate deflector in operative position over a container to be filled.

Figure 2 is a plan view of the preferred embodiment of a condensate deflector.

Figure 3 is a sectional view of the condensate deflector shown in Figure 2 taken along line 3—3 of Figure 2.

Figure 4 is a fragmentary view partially in axial section provided with a modified condensate deflector in which a condensate deflector and temporary bottle closure are formed integrally.

Figure 5 is a fragmentary view of a filling valve partially in axial section provided with a further modification of the invention in condensate deflectors.

Figure 6 is a plan view of a rotary bottle filler provided with bottle handling apparatus and associated conveying mechanism in which the supply tank has been cut away immediately above the filling valves.

Figure 7 is a fragmentary view of the lower portion of a filling valve and improved temporary bottle closure in partially broken away section.

Figure 8 is a plan view of a temporary bottle closure element shown on the filling valve of Figure 7.

Referring to the drawings of the preferred illustrations of the embodiments of the invention, like numerals being used to identify like elements in the different figures, 10 represents a milk or other liquid supply tank as shown in Figure 1 provided with an inclined lid or cover 11 having an overlapping condensate channel at its extreme outer edge to prevent condensate which may collect on the top of the cover 11 from draining onto the side of the tank 10. At the base of the vertical wall of the tank 10 and at the point of juncture between the vertical wall and the bottom of the tank there is provided a downwardly directed embossed rib 13 whereby the condensate flowing down the vertical wall of the tank is prevented from passing or draining onto the bottom of the tank or from passing or draining onto the filling valves carried by the supply tank 10.

The tank 10 is provided with a plurality of bottle filling valves of the vertically reciprocable spring biased sleeve type. These valves are demountably attached to the outer peripheral portion of the bottom of the tank 10. Each valve is comprised of a bracket or plug element 14 demountably attached in a flanged aperture in the bottom of the tank 10 and supporting an inner valve sleeve 15 which extends through the aperture in the bottom of the tank and onto which an outer valve sleeve 16 is telescoped. The outer valve sleeve 16 is of uniform outer dimension and reciprocably mounted upon the inner sleeve 15.

The lower extremity of the outer valve sleeve 16 comprises a valve seat for the vented valve element 17 against which the valve sleeve 16 is biased by valve spring 18. The valve 17 is maintained in position by the valve stem 19 which extends upwardly through the sleeves 15 and 16 and is detachably fixed upon the plug or bracket element 14. Immediately below the lower offset shoulder 44 at the lower end of the outer sleeve 16 there is provided a readily removable temporary bottle closure 20 which is telescoped over the lower end of the sleeve 16 below shoulder 44 and is preferably made of some resilient material, such as rubber, and adapted to seal the neck of a bottle 21 being filled from the valve mechanism.

To prevent the condensate which may collect on the outer surface of the filling valve from flowing down over the end of the filling valve whereby it may contaminate the interior of a bottle 21 by dropping thereinto and also to prevent the condensate flowing down from the walls of the supply tank 10 and its cover 11 from dropping into the bottle 21 while it is being moved into or away from filling position under the filling valve mechanism, a condensate deflector is provided on each filling valve. The condensate deflector of the preferred type, as shown in Figures 2 and 3, comprises a substantially flat trapezoid-shaped element 22 having a substantially centrally positioned aperture 23 of a diameter equal to the outer diameter of the lower end of the outer valve sleeve 16 immediately below the shoulder 44. The aperture 23 is positioned at approximately the geometrical center of the trapezoidal element 22.

The base portion 24 of the trapezoidal element 22 is inclined slightly upwardly while the apex portion 25 thereof is inclined slightly downwardly. The base and sides of the trapezoidal element 22 are bounded by an upwardly turned flange 26. When mounted on a valve assemblage the condensate deflector 22 is positioned between the shoulder 44 and the upper surface of the temporary bottle stopper 20 which holds it in place. Obviously the element 22 may also be soldered or otherwise permanently fixed to the shoulder 44. When so held in position, either by the element 20 or by soldering it to the shoulder 44, the deflector element 22 assumes a substantially horizontal position with its apex 25 directed inwardly toward the vertical axis of the supply tank 10 while the base portion 24 of the element 22 is directed outwardly from the vertical axis of the tank 10. The condensate deflector 22 is of such proportions that the upwardly turned base portion 24 extends outwardly from the filling valve mechanism a sufficient distance so as to catch any condensate which may drop from the embossed rib 13 in the lower outer edge of the tank 10 and to also overlap the path of travel of a bottle as it moves below the tank 10 when passing into or away from filling position.

The condensate which may be collected by the condensate deflector 22, whether it drops thereonto from the tank 10 or drains thereonto from the valve mechanism, is discharged from the downwardly turned apex portion 25 of the flanged trapezoidal element 22 toward the central space generally defined by the plurality of bottle filling valves arranged in circular order and supported on the bottom of the supply tank 10. The condensate so discharged by the condensate deflectors is entirely outside of the path of the bottles as they are passed into or away from filling position below the supply tank 10 and the bottle filling valve mechanisms.

As will be readily noted from Figure 1, the downwardly embossed rib 13 at the juncture of the vertical wall of the tank 10 with the bottom thereof comprises a shallow channel on the inside of the tank. In this shallow channel liquid may very readily be trapped and be prevented from entering into the filling valve mechanisms during the normal operation of the bottle filler. To avoid such objectionable feature a displacement ring 27 is provided which is readily removable from the tank 10 for the purpose of cleaning and which, when in position, displaces substantially all of the liquid content of the shallow channel on the interior of the embossed rib 13. By this procedure the undesirable wasting of milk or other liquid trapped in the shallow channel formed by the interior rib 13 is satisfactorily prevented.

In Figure 6 is shown a plan view of a conventional type of rotary bottle filling mechanism and, for the purpose of illustrating the arrangement and proportioning of the condensate deflectors and bottle transfer mechanisms, the liquid tank 10 is not shown. However, the valve mechanisms and the associated condensate deflectors are shown in their relative operative positions.

Figure 6 also illustrates a conventional type of continuous bottle conveyor 28 which supplies the bottles through an infeed regulator or gate generally indicated by the numeral 29 to a bottle transfer mechanism or star wheel 30. The bottles are received from the conveyor 28 and passed into the bottle pockets of the star wheel 30 which in turn transfers them by cooperation with a bottle guide 31 into bottle filling position below the filling valves of the rotary supply tank 10. While the bottles are in filling position they are supported in the conventional manner upon bottle pedestals.

The entire movement of the bottles from the conveyor 28 by the star wheel 30 into the bottle filling position below the filling valves is of a continuous nature. Obviously at some point along such path of travel the bottles pass below the outer vertical wall of the supply tank 10 and the condensate drip rib 13, during which motion or passage the bottles 21 would normally be exposed to the condensate draining from the tank 10 and the rib 13. To prevent such dripping of condensate into the open sterile bottles as they are being moved into position below the supply tank 10 and the filling valve mechanisms, the condensate deflectors 22 are constructed in such a manner as to have the general outline of a trapezoid. These deflectors 22 are of a sufficient size so that the leading edge of the wide base 24 overlaps the mouth of the bottle 21 at a point in the path of travel of the bottle immediately ahead of the position in which the bottle passes below the outer edge of the supply tank.

By so shielding the mouth of the bottle any condensate which may drain from the side of the tank 10 or the drip rib 13 and drop toward the mouth of the bottle will be caught by the leading edge of the base 24 of the deflector 22 from which it will be drained as has been previously pointed out. Since the motion of the filling valves of the bottle filler are, of course, the same as the motion of the rotating supply tank 10 to which they are fixed, which motion is synchronized with the motion of the bottle being moved into filling position below the respective valves, and since the further movement of the bottle is directed further inwardly from the base of the trapezoidal deflector element 22, the mouth of each respective bottle will continue to be covered or guarded by the condensate deflector of the respective valve under which the bottle is being positioned, thereby continually protecting the bottle from contamination from dropping condensate.

The bottles, after being filled during the rotation with the supply tank 10, are discharged from the filling position below the filling valve mechanisms by engagement with the guide element 31 and a discharge star wheel 32. In the discharge of the bottles from filling position they are again protected by the enlarged base 24 of the trapezoidal condensate deflector 22 as they pass from the zone in which condensate may drain from the filling tank, filling valves and the drip ring 13. The discharge star wheel 32 then returns the bottles 21 to the supply conveyor 28 by any suitable arrangement of additional bottle transfer mechanisms.

To assemble the condensate deflectors 22 onto the bottle filling valves of the conventional type, as shown in Figure 1, it is only necessary to remove the temporary bottle closure 20 and telescope the apertured deflector element 22 over the outer sleeve 16 of the bottle filling valve. The aperture 23 of the deflector element 22 is of such dimension and configuration, preferably circular, as to provide a very close leak-proof fit on the outer surface of the valve sleeve 16, if not soldered thereto.

In Figure 4 is shown a modified condensate deflector in which the condensate deflector 33 is formed integrally with the temporary bottle stopper 34. Like the condensate deflector 22 the deflector element 33 is also of substantially trapezoidal configuration and is also substantially flat and mounted horizontally upon the filling valve. The deflector 33 is provided with a centrally raised portion at the juncture of the deflector 33 with the temporary bottle closure 34. The deflector element 33 is also provided with a peripheral upwardly extending flange 35 along its sides and base. The apex portion 36, however, of the deflector element 33 is inclined downwardly and is not provided with an upwardly extending flange to thereby comprise in substance a spout or draining provision for the deflector 33. Like unto the arrangement of the deflector element 22, the apex portion or spout 36 of the deflector 33 is also directed inwardly toward the vertical axis of the supply tank 10.

In Figure 5 is shown a still further modification of the invention in condensate deflectors. In this modification the condensate deflector element 37 is formed integrally with the outer valve sleeve 16 but in all other respects is of similar configuration and proportion as the deflector 33 shown in Figure 4.

In Figures 7 and 8 are shown various views of a modified temporary bottle closure 38 which is preferably formed of resilient material, such as rubber, and is substantially of the configuration of an inverted, truncated, axially apertured cone. The inner periphery of the aperture in the temporary bottle closure 38 is provided with a metallic or other type of suitable sleeve 39 permanently fixed in any conventional manner to the resilient temporary bottle closure 38.

The sleeve 39 is provided with one or more inwardly extending studs 40 to engage complementary grooves 41 in the outer periphery of the lower offset extremity of the outer sleeve 16 to form therewith a bayonet lock to maintain the temporary bottle closure in operative position upon the lower offset portion of the valve sleeve 16. The bayonet lock thus formed between the studs 40 and the groove 41, which groove is of the conventional inclined type used in the formation of bayonet joints, is, however, so designed as to permit slight vertical, reciprocable motion between the inner sleeve 39 of the temporary closure 38 and the offset lower extremity of the valve sleeve 16. Such reciprocal motion of the sleeve 39 and the temporary bottle closure 38 is incidental to the filling operation during which the mouth of a bottle engages the resilient closure 38 and exerts thereupon an upwardly directed pressure to open the filling valve mechanism.

The exertion of such pressure against the temporary closure 38 forces the upper surface thereof against the offset shoulder 42 of the outer valve sleeve 16. Such compressive force is normally sufficient to deform the upper surface of the resilient element 38 to thereby bring about a sufficient deforming of the surface of the radially extending grooves 43 in the upper surface of the temporary closure element 38 to seal the same against the offset shoulder 42.

After the bottle has been filled and the compressive force of the bottle against the resilient closure 38 is again released, the deformed upper surface of the temporary closure and the grooves 43 again resume their normal shape. Such resumption of the normal shape permits influx of air through the grooves 43 into the passage between the sleeve 39 and the offset portion of the lower extremity of the valve sleeve 16 upon which the sleeve 39 is loosely mounted and into the bottle 21, thereby facilitating the ready removal of the bottle from the filling valve mechanism.

The condensate deflector in its various modifications which have just been described in detail, together with the additional cooperative structural elements of the supply tank and filling valve, assures a satisfactory sanitary filling of containers due to the unique and novel construction of the improved elements of the bottle filling apparatus which has just been described. Such condensate deflectors may, of course, be easily applied on any of the various types of bottle filling apparatus, such as the rotary automatic bottle fillers. However, though they are particularly well adapted for use on the rotary type of bottle fillers, they are also adaptable for use on bottle fillers in which the supply tanks are stationary. In each of these various types of bottle fillers the condensate deflectors of the type disclosed satisfactorily protect the bottles in their passage to and from filling position to prevent the contamination thereof by draining condensate.

While certain specific embodiments of the condensate deflectors have been particularly described and illustrated it should, of course, be understood that these specific embodiments have been used for the purpose of illustration only. To those skilled in the art various changes and modifications thereof may be apparent without departing from the spirit and scope of the invention which is not to be limited except in so far as is necessary by the prior art and the spirit of the appended claim.

The invention is hereby claimed as follows:

A bottle filling machine comprising, in combination, a supply reservoir rotatable about a vertical axis, a series of radially disposed bottle filling means having bottle engaging portions and depending from the lower wall of said reservoir and communicating therewith through apertures in said wall adjacent the outer periphery thereof, a downwardly directed rib in said lower wall circumscribing said bottle filling means, means for moving a bottle into filling position below said reservoir under said filling means, means for withdrawing a bottle from said filling position, and a condensate deflecting element carried by said filling means adjacent the bottle engaging portions thereof, said condensate deflecting element being trapezoidal in shape and having its principal axis radially directed with respect to said reservoir and having its apex portion inwardly directed toward the axis about which said reservoir revolves, the base portion of said condensate deflecting element extending outwardly below said downwardly directed rib of said reservoir wall and having the ends of said base portion so arranged as to overlap the entire path of travel of a container as it is moved into filling position and as it is being withdrawn from filling position below said reservoir.

ADOLPH J. LIPPOLD.